US012701130B2

(12) United States Patent
Zahavi et al.

(10) Patent No.: US 12,701,130 B2
(45) Date of Patent: Aug. 4, 2026

(54) SYSTEMS AND METHODS FOR USING MACHINE LEARNING MODELS FOR IMPROVED AND CUSTOMIZED CYBER THREAT INTELLIGENCE

(71) Applicant: COGNYTE TECHNOLOGIES ISRAEL LTD, Herzliya Pituach (IL)

(72) Inventors: Gilad Zahavi, Herzliya Pituach (IL); Mickael Soussan, Herzliya Pituach (IL)

(73) Assignee: COGNYTE TECHNOLOGIES ISRAEL LTD, Herzliya Pituach (IL)

( * ) Notice: Subject to any disclaimer, the term of this patent is extended or adjusted under 35 U.S.C. 154(b) by 132 days.

(21) Appl. No.: 18/395,855

(22) Filed: Dec. 26, 2023

(65) Prior Publication Data

US 2024/0214409 A1 Jun. 27, 2024

Related U.S. Application Data

(60) Provisional application No. 63/435,362, filed on Dec. 27, 2022.

(51) Int. Cl.
*H04L 9/40* (2022.01)
*G06F 40/295* (2020.01)
*G06F 40/40* (2020.01)

(52) U.S. Cl.
CPC ........ *H04L 63/1433* (2013.01); *G06F 40/295* (2020.01); *G06F 40/40* (2020.01)

(58) Field of Classification Search
CPC ... H04L 63/1433; G06F 40/295; G06F 40/40; G06F 21/577; G06N 20/00
USPC .......................................................... 726/25
See application file for complete search history.

(56) References Cited

U.S. PATENT DOCUMENTS

| | | | |
|---|---|---|---|
| 2007/0192474 A1* | 8/2007 | Decasper | H04L 67/306 709/223 |
| 2020/0210590 A1* | 7/2020 | Doyle | G06F 21/577 |
| 2021/0216643 A1* | 7/2021 | Mishra | G06F 8/61 |
| 2022/0103575 A1 | 3/2022 | Fokker | |
| 2022/0166755 A1* | 5/2022 | Moore | H04L 63/0263 |

(Continued)

OTHER PUBLICATIONS

MD Rayhanur Rahman et al: "What are the attackers doing now? Automating cyber threat intelligence extraction from text on pace with the changing threat landscape: A survey", arxiv.org, Cornell University Library, 201 Olin Library Cornell University Ithaca. NY 14853, Sep. 14, 2021 (Sep. 14, 2021), XP091052847.

(Continued)

*Primary Examiner* — Meng Vang
(74) *Attorney, Agent, or Firm* — ISUS Intellectual Property PLLC; Anthony Jason Mirabito

(57) ABSTRACT

The present disclosure provides a method and system to produce a custom threat actor score. Generic cyber threat intelligence (CTI) is received by the system and analyzed by a natural language processor to generate cyber-attack parameters. A generic score is calculated based on the cyber-attack parameters. New Data of Interest (NDI) is collected from an enterprise and processed through a machine learning model to generate analyzed NDI data terms. An NLP is updated with the analyzed NDI data terms to create an enhanced NLP engine. The enhanced NLP engine generates custom cyber-attack parameters from CTI sources. A custom threat score is calculated based on the cyber-attack parameters combined with the custom cyber-attack parameters.

15 Claims, 4 Drawing Sheets

(56) References Cited

U.S. PATENT DOCUMENTS

| | | | | |
|---|---|---|---|---|
| 2022/0358225 | A1* | 11/2022 | Gadde | H04L 51/02 |
| 2023/0077527 | A1* | 3/2023 | Sarkar | G06Q 10/0635 |
| | | | | 705/7.28 |
| 2023/0224324 | A1* | 7/2023 | Karabey | H04L 63/1466 |
| | | | | 726/23 |

OTHER PUBLICATIONS

Irshad Ehtsham et al: "Cyber threat attribution using unstructured reports in cyber threat intelligence", Egyptian Informatics Journal. Elsevier, Amsterdam. NL, vol. 24, No. 1, Dec. 9, 2022 (Dec. 9, 2022), pp. 43-59, XP087273182. ISSN: 1110-8665, DOI: 10.1016/J.EIJ.2022.11.001 [retrieved on Dec. 9, 2022].
Caroline Hillier et al: "Turning the Hunted into the Hunter via Threat Hunting: Life Cycle. Ecosystem, Challenges and the Great Promise of AI". arxiv.org, Cornell University Library. 201 Olin Library Cornell University Ithaca, NY 14853, Apr. 23, 2022 (Apr. 23, 2022), XP091208042.

* cited by examiner

SYSTEMS AND METHODS FOR USING MACHINE LEARNING MODELS FOR IMPROVED AND CUSTOMIZED CYBER THREAT INTELLIGENCE

RELATED APPLICATIONS

This application claims priority to U.S. Provisional Application No. 63/435,362 filed Dec. 27, 2022, entitled SYSTEMS AND METHODS FOR USING NAMED-ENTITY RECOGNITION FOR IMPROVED CYBER THREAT INTELLIGENCE, the entire contents of which is herein incorporated by reference.

BACKGROUND OF TECHNOLOGY

Various techniques exist for investigating cyber threats. Cyber Threat Intelligence (CTI) provides knowledge, information and data about cybersecurity threats and risks to an enterprise computing environment. Such solutions aim to enable better decision making and reduce risk and the chance of an enterprise computing environment being compromised. Monitoring, collection of data, analysis of data, and delivery of threat potential are some of threat intelligence solutions. The enterprise computing environment being compromised, as used in the current disclosure "compromised" includes, without limitation, physical damage, property theft, data loss and system disruption.

SUMMARY OF DESCRIBED SUBJECT MATTER

In an aspect of the current disclosed technology, there is a method, comprising: receiving, by a processor in an enterprise computing environment of an enterprise, new data of interest (NDI) from a user in the enterprise computing environment; identifying, by the processor and at least one machine learning model (ML), a plurality of threat actors based on the NDI; classifying, by the processor and the at least one ML, a plurality of custom cyber-attack parameters based on the NDI; correlating, by the processor and the at least one ML, the plurality of threat actors and the plurality of custom cyber-attack parameters; calculating, by the processor, a custom threat score for each threat actor identified based on the correlation of the plurality of cyber-attack parameters to each of the threat actors; and causing, by the processor, to present a visual cyber-attack parameters representation for each of the plurality of threat actor on a display device.

In another aspect the method includes, receiving, by the processor, generic cyber threat intelligence (CTI) data from multiple cyber-related data sources; classifying, by the processor and the at least one ML, the CTI data into relevant CTI data and non-relevant CTI data; classifying, by the processor and the least one ML, the relevant CTI data into cyber-attack parameters; identifying, by the processor and the at least one ML, a plurality of generic threat actors based on the relevant CTI data; correlating, by the processor and the at least one ML, the plurality of generic threat actors and the plurality of cyber-attack parameters; calculating, by the processor and the at least one ML, a generic threat score for each of the plurality of generic threat actors identified based on the correlation of the plurality of cyber-attack parameters to each of the plurality of generic threat actors; and causing, by the processor, to present a visual cyber-attack parameters representation for each of the plurality of threat actor on a display device.

In yet another aspect of the current disclosed technology, a second custom threat score is calculated, by the processor, based on the generic threat score and the custom threat score. Also, the correlation between the plurality of threat actors and the plurality of cyber-attack parameters is a correlation between each of the plurality of threat actors with at least one of the plurality of cyber-attack parameters.

In an aspect of the current disclosed technology, there is a method comprising: receiving, by a processor in an enterprise computing environment of an enterprise, new data of interest (NDI) from a user in the enterprise computing environment of an enterprise; processing, by the processor and at least one machine learning model (ML), the NDI to generate NDI data terms; updating, by the processor, a Natural Language Processing (NLP) engine with the NDI data terms to produce an enhanced NLP engine; analyzing, by the processor and the enhanced NLP engine, generic cyber threat intelligence (CTI) data from multiple cyber-related data sources to determine a plurality of custom cyber-attack parameters and a plurality of custom threat actors; correlating, by the processor, each of the plurality of custom threat actors and the plurality of custom cyber-attack parameters; calculating, by the processor, a custom threat score for each of the plurality of custom threat actors based on the correlation of the plurality of custom cyber-attack parameters to each of the plurality of custom threat actors; and transmitting, by the processor, the custom threat score to a display. This method further includes generating, by the processor, a visual representation of the custom threat score. Also, the NLP engine further comprises at least one Named Entity Recognition (NER) engine.

In another aspect the method includes: receiving, by the processor, the CTI data from multiple cyber-related data sources; analyzing, by the processor and the NLP engine, the CTI data to identify a plurality of cyber-attack parameters; classifying, by the processor, the plurality of identified cyber-attack parameters; identifying, by the processor, a plurality of generic threat actors; correlating, by the processor, each of the plurality of generic threat actors and the plurality of cyber-attack parameters; calculating, by the processor, a generic threat score for each of the generic threat actors identified based on the correlation of the plurality of cyber-attack parameters to each of the plurality of the generic threat actors; calculating, by the processor, a new custom threat score based on the generic threat score and the custom threat score; and transmitting by the processor, the new custom threat score to a display.

In another aspect the method includes generating, by the processor, a visual representation of the custom threat score and that the NLP engine further comprises at least one Named Entity Recognition (NER) engine.

In an aspect of the current disclosure there is a system, comprising: a display; a processor; at least one machine learning model (ML); a memory communicatively coupled to the processor, wherein the memory stores processor-executable instructions. Upon execution of the processor-executable instructions the processor: receive new data of interest (NDI) from a user in the enterprise computing environment of the enterprise; process, with the at least one ML, the NDI to generate NDI data terms; update a Natural Language Processing (NLP) engine with the NDI data terms to produce an enhanced NLP engine; analyze, with the enhanced NLP engine, generic cyber threat intelligence (CTI) data from multiple cyber-related data sources to determine a plurality of custom cyber-attack parameters and a plurality of custom threat actors; correlate each of the plurality of custom threat actors and the plurality of custom cyber-attack parameters; calculate a custom threat score for each of the plurality of custom threat actors based on the correlation of the plurality of custom cyber-attack parameters to each of the plurality of custom threat actors; and transmit the custom threat score to a display. The processor further generates a visual representation of the custom threat score.

In a final aspect of the current disclosure there is a system wherein the processor is further configured to: receive the CTI data from multiple cyber-related data sources; analyze, with the NLP engine, the CTI data to identify a plurality of cyber-attack parameters; classify the plurality of identified cyber-attack parameters; identify a plurality of generic threat actors; correlate each of the plurality of generic threat actors and the plurality of cyber-attack parameters; calculate a generic threat score for each of the generic threat actors identified based on the correlation of the plurality of cyber-attack parameters to each of the plurality of the generic threat actors; calculate a new custom threat score based on the generic threat score and the custom threat score; and transmit the new custom threat score to a display.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
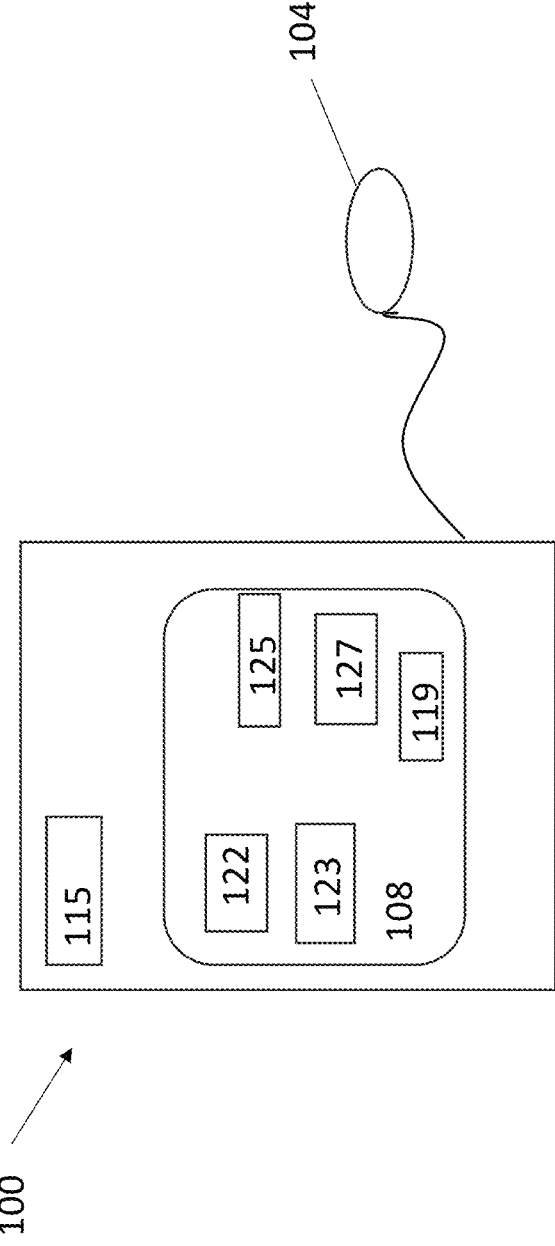
FIG. 1 illustrated schematic computer-based architecture of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

As used and referenced herein, an "enterprise computing environment" is a computing architecture of an entity with numerous employees utilizing numerous computing devices connected to internal internet capabilities with numerous computing resources/systems, including one or more servers (e.g., enterprise servers (such as proxy servers, content servers, administrative servers, servers with the ability to manage enterprise-wide program) running numerous computer programs, and having one or more data centers. Enterprise computing environment encompasses all the various types of enterprise software, including but not limited to database management, accounting, inventory, resource management, streamlining process, and/or relationship management. Enterprise computing environment typically has applications standard across the system, while the application being used, and the data being accessed in each area will be different.

As used and referenced herein, the term "cyber-attack" includes, without limitation any attempt to expose, alter, disable, destroy, steal or gain unauthorized access to or make unauthorized use of an asset in computers and computer networks. For example, a cyber-attack is any type of offensive maneuver that targets computer information systems, infrastructures, computer networks, or personal computer devices. An attacker is a person or process that attempts to access data, functions, or other restricted areas of the system without authorization, potentially with malicious intent.

Some embodiments of the present disclosure are directed to a technical problem regarding the reliability of data regarding cyber-attacks or threats to a specific entity against an asset in computers, computer networks, and/or an enterprise computing environment. Operationalizing threat intelligence data of cyber-attacks remains a challenge for organizations or entities, since it typically requires human analysts to extract relevance out of the millions of pieces of information being aggregated. The lack of customizable data on these potential cyber-attack parameters, create uncertainty in allocation of resources for the enterprise computing environment to defend against a cyber-attack or a plurality of cyber-attacks. In some embodiments, the present disclosure has the technical solution, of at least, determining a plurality of custom cyber-attack parameters and scores by threat actor. Therefore, allocation of resources is facilitated.

In another set of technical solutions and/or technical improvements, explained in more detail below, includes aspects of presenting a representation of visual cyber-attack parameters likelihood with their corresponding score values regarding the likelihood of cyber-attack organized by threat actor. The visual cyber-attack representation may include a visual mapping of each potential determined threat actor with at least one cyber-attack parameter correlated with the threat actor including the likelihood or activity noted in each of those cyber-attack parameters. Based on automatic assessments and mapping of these cyber-attacks to a customized format, further technical benefits become available to users and operators of these systems and methods. The automatic assessments may be in real-time. Moreover, various practical applications of the present disclosure are also described, which provide further practical benefits to users and operators that are also new and useful improvements in the art.

In some embodiments, threat actors are correlated with at least one cyber-attack parameter. Moreover, threat actors may be correlated with as many cyber-attack parameters identified by the system or requested as threat parameters by a user/administrator of the system. Cyber-attack parameters as described in more detail below may be but are not limited to:

1. Threat actor type also known as ta type. This parameter may be any combination of advanced persistent threat or APT (which may be a nation state), cybercrime, or hacktivist;
2. Activity timeline regarding occurrences and frequency (number of occurrences/frequencies);
3. Targeted industries or enterprise (type of industry plus number of attacked industries);
4. Targeted countries including the number of attacked countries (number of attacked countries);
5. Common Vulnerabilities and Exposure, CVE (CVE risk acquired from other known databases on cyber threats);

6. Number of exploited vulnerabilities (CVEs);

7. Tactics techniques and procedures also known as TTPs. Some examples are malware, attack tools, and attack vectors (methods used by hackers). TTPs describe the way the attacks work;

8. Location of target entity or enterprise;

9. Location of threat actor;

10. Number of attack tools used in a threat actor campaigns;

11. Number of targeted enterprises;

12. Frequency of a threat actor attacks; and

13. Severity score per each threat actor type (nation-state vs. cybercrime vs. hacktivist).

One technique typically used to gather CTI is applying Natural Language Processing (NLP) to automate the identification of threat actors, malware that attack computer systems, various attack techniques and more. These techniques may detect and highlight large amount of data. However, these techniques typically rely on known dictionary/pattern-based NERs (Named-Entity Recognition).

The current disclosure, in some embodiments, has a system and method that employ machine learning models to identify new and unknown cyber threats. In some embodiments, the system and method, correlate the relationships between cyber threat components. In some embodiments, a custom dynamic threat score for cyber threats is generated. In some embodiments, the machine learning models customize new cyber threat intelligence to a specific enterprise computing environment, such as an organization, an industry, or a nation.

FIG. 1 schematically illustrates an example computer environment for a system for improved cyber threat intelligence (hereinafter Improved CTI) 100 in accordance with one or more embodiments of the present disclosure.

In some embodiments, the improved CTI system includes one or more engines or modules 108 that may be in the memory of the improved CTI system. It will be appreciated that such engines may be represented as a single engine or a combination of different engines. One of the engines may be a New Data of Interest (NDI) engine 125, a cyber-attack parameters quantification engine 119, one or more unsupervised machine learning models (ML) including, a first ML 127, a Natural Language Processing (NLP) 122 engine further including a named-entity recognition (NER) engine 123. NER processing is an NLP technique that automatically identifies named entities in a text and classifies them into predefined categories of cyber-attack parameters or vectors. In some embodiment, at least one ML is communicatively coupled to the CTI system and may be a large language model.

In some embodiments, the NER engine 123 and the NLP engine 122 includes computer-readable instructions to execute an unsupervised statistical technique used to examine meta data and identify features that interrelate to a set of variables.

In some embodiments, the at least one ML or plurality of ML of the present disclosure may be configured to utilize one or more AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, a neutral network technique may be one of, without limitation, feedforward neural network, radial basis function network, recurrent neural network, convolutional network (e.g., U-net) or other suitable network. In some embodiments and, optionally, in combination of any embodiment described above or below, a trained neural network model may specify a neural network by at least a neural network topology, a series of activation functions, and connection weights.

The at least one ML, in some embodiments, receive the training data and divides data points into different groups to produce a collection of data points based on similarity and dissimilarity features between such data points. Data points in the same groups are more like other data points in the same group and dissimilar to the data points in other groups. In some implementations the ML can utilize a k-means technique or other suitable clustering technique. In some implementations the ML can be a clustering model. In some embodiments, a final prediction can be obtained as a function of the predictions of one or more different individual trained models e.g., the average of the individual predictions. In some embodiments, the training data is based on predetermine, tagged CTI related sentences, coming from known CTI databases.

Improved CTI system 100 also comprises a processor 115. The improved CTI system 100 may be hosted on a single computer or server. Alternatively, the features and functions of the improved CTI system 100, as described herein, may be distributed over a plurality of networked computers, which may consist of or include computers serving a cloud platform. In this disclosure, processor 115 (in the singular) is understood to mean one or more processors 115 of the Improved CTI system, whether the improved CTI system is hosted on a single computer or whether the features and functions are distributed over a plurality of networked computers.

The processor 115 may be in wired or wireless connection to one or more non-transitory computer-readable media that may comprise any combination of volatile memory, non-volatile memory, and storage devices. The processor 115 may retrieve and execute programming instructions stored on storage medium as part of the system. Similarly, processor 115 may retrieve and store application data residing on storage medium as part of the system.

The improved CTI system may further comprise one or more Input/Output (I/O) device interfaces 104 that may allow for the connection of various I/O devices. The system may also interface with a network (not shown.) In some embodiments, a user or administrator may interact with the improved CTI system via a display device and user input devices 104. The I/O devices 104 may include, but is not limited to, e.g., a display, a mouse, a keyboard, a touch panel of the display device, motion tracking and/or detecting, a microphone, an imaging device such as a digital camera, pen input, among other input devices. Results and statuses related to custom cyber-attack parameters and operation thereof may be displayed to the user as a visual cyber-attack representation via the display device.

Figure 2:
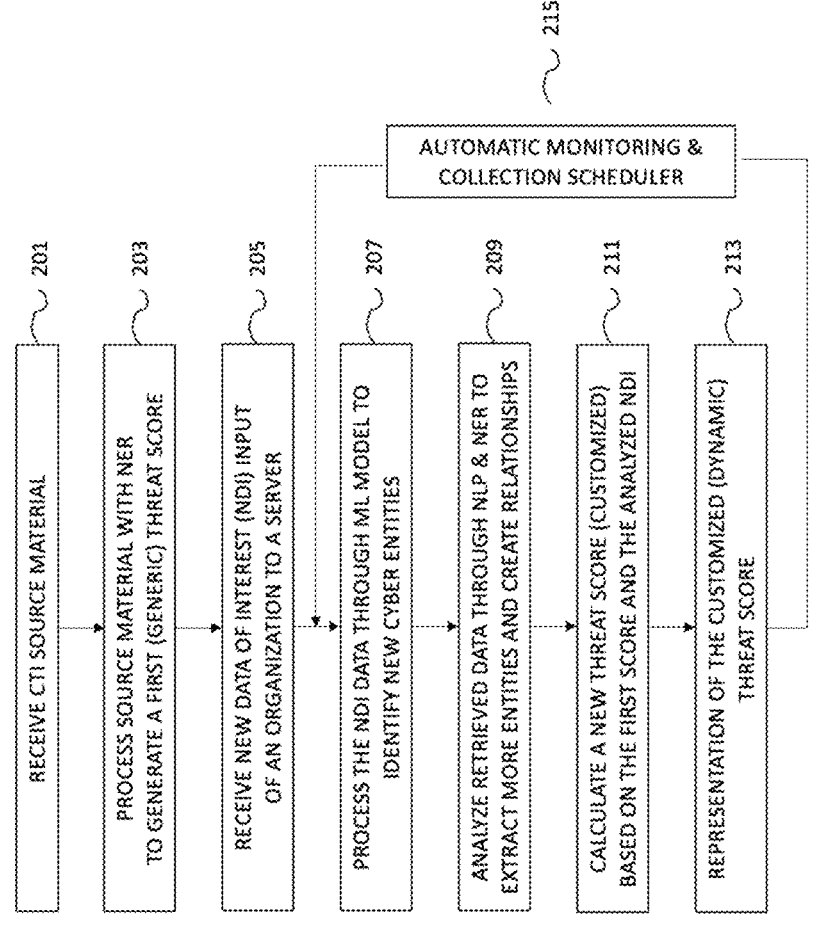
FIGS. 2 and 3 are schematic flow diagrams of a methods of at least some embodiments of the present disclosure.

FIG. 2 is a flow chart illustrative of the process in some embodiments of the current disclosure.

At 201, in some embodiments, the improved CTI system receives and processes cyber threat intelligence data (Hereinafter CTI data) from multiple cyber-related data sources (e.g., Deep/Dark Web, human-driven finished intelligence feeds, and threat indicators data).

At 203, in some embodiments, the improved CTI system analyzes the CTI data by the NER engine and generate a generic threat score. The generic threat score quantifies cyber-attack parameters with threat actors from the CTI data. The CTI data may include cyber-attack parameters or threats not necessarily related to the enterprise computing environment. In some embodiments, the ML and NER engine are used to analyze the CTI data. In some embodiments, the generic score is based on aggregation and analysis of pre-processed data to classify the data into a number of cyber-attack parameters. The classification of data into the cyber-attack parameters may be done by a rule-based classification.

In some embodiments, the generic threat score is calculated by the cyber-attack parameters quantification engine operable to automatically and dynamically determine and output, calculate, and aggregate a percentage value of each of the cyber-attack parameters correlated to a threat actor based on the analysis of likelihood and strength of a cyber-attack. In some embodiments, the average of all the cyber-attack parameters is calculated to produce the generic threat score. The cyber threat quantification engine may use proprietary algorithms to achieve the outputs.

At 205, in some embodiments, the improved CTI system receives new data of interest (hereinafter NDI data), such as terms that relate to a specific enterprise and its enterprise computing environment (from a user operating in a specific enterprise). An enterprise may be, but is not limited to, banking, finance, retail, manufacturing, critical infrastructure, healthcare, and automotive. In some embodiments, the system will begin the process at 205, by receiving NDI data and not perform at 201 and at 203. In some embodiments, and when the method starts at 205, the multiple CTI data sources are still employed by the improved CTI system to identify the threat actors and cyber-attack parameters.

At 207, in some embodiments, the improved CTI system analyzes the NDI data by the least one ML to identify in multiple known CTI data sources new threat actors also known as cyber entities and data related before classification into cyber-attack parameters to those threat actors of potential cyber threats (hereinafter, analyzed NDI data).

At 209, in some embodiments, the improved CTI system further analyzes the analyzed NDI data by the NLP and NER engines to generate additional new threat actors as well as potential new cyber-attack parameters. In some embodiments, the analyzed NDI data is used to enrich the NER engine and NLP engine capabilities by updating or training the NLP and NER engines with analyzed NDI data terms. With these enriched capabilities the NER engine and NLP engine may process multiple known CTI data sources to produce additional threat actors and correlates the relationships between the threat actors and cyber-attack parameters. In some embodiments, threat actors are correlated with at least one cyber-attack parameter and if there is more than one cyber-attack parameter they are correlated with as many cyber-attack parameters identified by the system or requested as threat parameters by a user/administrator of the system.

In some embodiments, the improved CTI system generate custom cyber-attack parameters based on correlations between threat actors and cyber-attack parameters. In some embodiments, the improved CTI system aggregates and analyzes the additional threat actors and cyber-attack parameters to classify into custom attack parameters. The classification of data into the different custom cyber-attack parameters may be done by a rule-based classification.

At 211, in some embodiments, the improved CTI system calculates a custom threat score using both the cyber-attack parameters and the custom cyber-attack parameters. A percentage value may be determined for each of the custom cyber-attack parameters, based on the analysis of likelihood and strength of a cyber-attack of that parameter. The percentage value of the cyber-attack parameters already determined, is combined with the percentage value of the custom cyber-attack parameters and the average of all the combined cyber-attack parameters is calculated to produce the custom threat score. In some embodiments, a representation of the custom threat score will be shown. In some embodiments, and if the system began at step 205, a custom threat score is only based on custom cyber-attack parameters.

At 213, in some embodiments, the improved CTI system generates a representation of the custom and dynamic threat score.

At 215, in some embodiments, the improved CTI system will repeat the process of 207 to 213 at predetermined intervals or according to an automated monitoring and collection scheduler. A process to repeat at 201 may also be executed at predetermined intervals according to an automated monitoring and collection scheduler. The predetermined intervals of repeating at 201 may be different than the predetermined intervals to repeat at 207.

By way of a specific but non-limiting example, in some embodiments, a preprocessing of data is employed to generate a generic score based on at least some of the cyber-attack parameters. As part of the specific example, the system also receives NDI data consisting of custom input data of an organization or entity, such as, but not limited to, region, industry, IT systems/software/web applications, or any combination of the above. A client region such as APAC. A client industry such as a financial service—Bank. In some embodiments, the system monitors new relevant data, and is processed through the systems NLP engine and a trained ML model and custom components (i.e.: NER, . . . ). An example of threat actors identified and labeled are:

Lazarus Group: threat actor;
North Korea: origin of attack;
South Korea: targeted country;
supply chain attack: attack vector;
WIZVERA VeraPort: targeted software;
Lazarus remote access trojan: malware.

At least one of the models of the ML engine 127 then correlates relationships between the extracted and identified threat actors/entities:

Lazarus Group→located at→North Korea
Lazarus Group→targets→South Korea;
Lazarus Group→uses→supply chain attack;
Lazarus Group→targets→WIZVERA VeraPort
Lazarus Group→uses→Lazarus remote access trojan Once a threat actor has been identified, the system searches for preprocessed data in known data bases regarding threat actors for the identified threat actor.

Based on both the cyber-attack parameters of the generic score and the custom cyber-attack parameters produced by the system, a custom score is calculated. Finally, the system generates and provides a representation of the threat actor score to a user.

Figure 3:
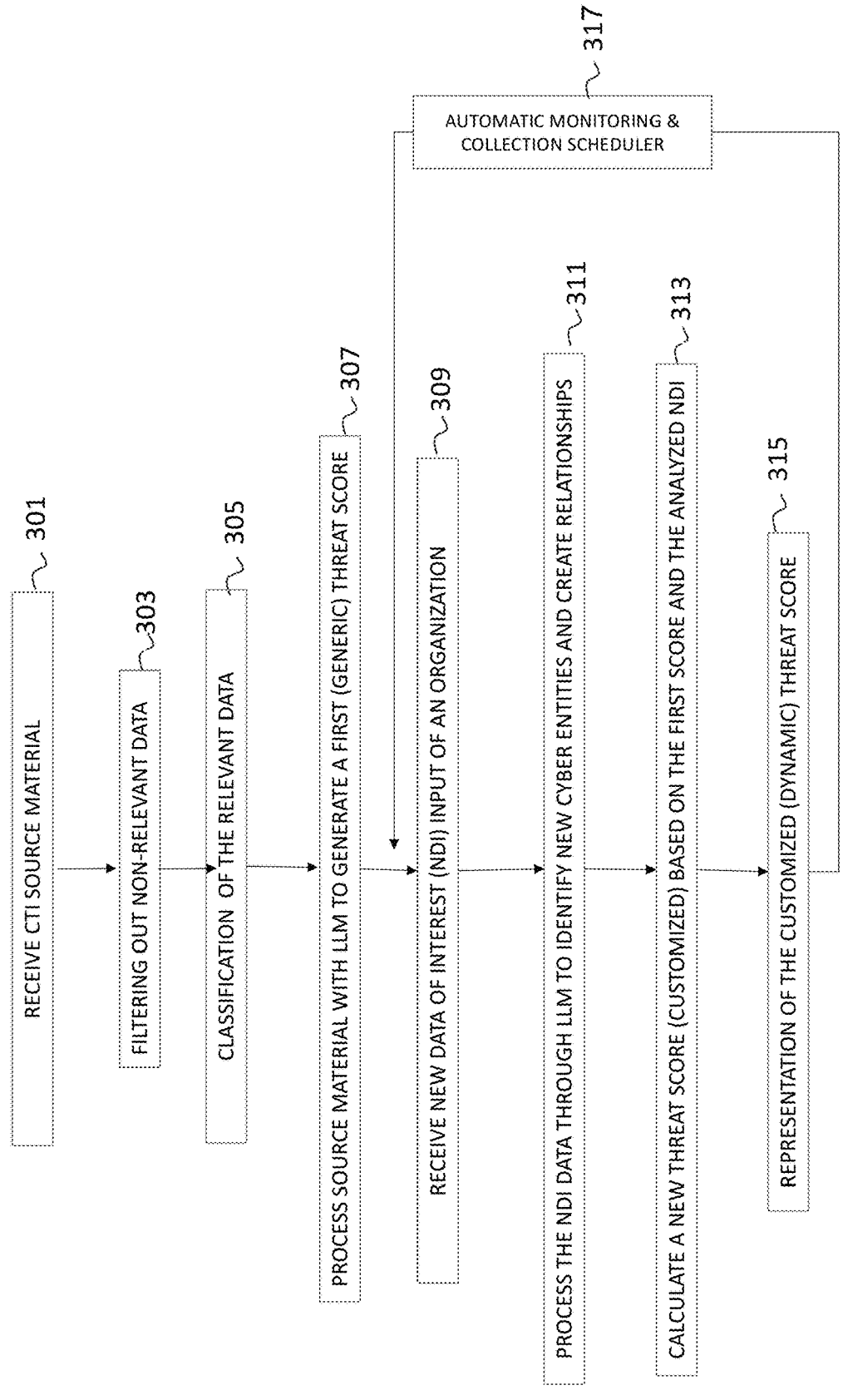

FIG. 3 is a flow chart illustrative of the process in some embodiments of the current disclosure.

At 301, in some embodiments, the improved CTI system receives and processes cyber threat intelligence data from multiple cyber-related data sources (e.g., Deep/Dark Web, human-driven finished intelligence feeds, and threat indicators data).

At 303, in some embodiments, the improved CTI system filters or classifies by the at least one ML, the cyber-related data to non-relevant data or relevant data. In some embodiments, the ML is a large language model. In some embodiments, the relevant data is data related to cyber threat vectors to an enterprise computing environment of interest.

At 305, in some embodiments, the improved CTI system classifies the relevant data into cyber-attack parameters by the at least one ML. In some embodiments, the ML is provided a list of classification parameters to classify into. The list of the classification's parameters may be a closed list and may be 12 classification parameters. The at least one ML may be a large language model.

At 307, in some embodiments, the improved CTI system analyzes the CTI data using the at least one ML such as a large language model. In some embodiments, the improved CTI system generates a generic threat score. The generic threat score quantifies all threats from the CTI data. In some embodiments, the generic score is based on aggregation and analysis of pre-processed data to classify the data into a number of cyber-attack parameters. The classification of data into the cyber-attack parameters may be done by a rule-based classification.

In some embodiments, the generic threat score is calculated by determining a percentage value of each of the cyber-attack parameters based on the analysis of likelihood and strength of a cyber-attack of that cyber-attack parameter. In some embodiments, the average of all the cyber-attack parameters is calculated to produce the generic threat score.

At 309, in some embodiments, the improved CTI system receives new data of interest (NDI data), such as terms that relate to an enterprise computing environment of interest from a user operating in an enterprise computing environment of interest, such as but not limited to, banking and finance, retail, manufacturing, critical infrastructure, healthcare, and automotive.

In some embodiments, cyber threat intelligence data from multiple cyber-related data sources is not collected and the first collection of data is NDI data 309. In some embodiments, and when at 309 is the first collection of data, the at least one ML, such as a large language model, may then filter out non-relevant data to keep only the relevant data 303. Then at least one of the ML may classify the relevant data into cyber-attack parameters 305 and then the improved CTI system may continue to 311.

At 311, in some embodiments, the improved CTI system processes the NDI data through the at least one ML, to identify new threat actors and data related to those threat actors of potential cyber threat (hereinafter, analyzed NDI data). In some embodiments, the at least one ML identifies new threat actors and data related to those threat actors in the multiple known CTI data sources. The data related to the threat actors may be employed later once classified into cyber-attack parameters. The at least one ML may be a large language model.

In some embodiments, the improved CTI system aggregates and analyzes the additional threat actors to correlate the relationships between cyber-attack parameters based on identifying new cyber threats to obtain new intelligence. The classification of data into the different cyber-attack parameters may be done by a rule-based classification. In some embodiments, threat actors are correlated with at least one cyber-attack parameter and if there is more than one cyber-attack parameter they are correlated with as many cyber-attack parameters identified by the system or requested as threat parameters by a user/administrator of the system.

At 313, in some embodiments, the improved CTI system calculates a custom threat score using both the cyber-attack parameters and the custom cyber-attack parameters. A percentage value may be determined for each of the custom cyber-attack parameters, based on the analysis of likelihood and strength of a cyber-attack of that parameter. In some embodiments, the percentage value of the cyber-attack parameters already determined, is combined with the percentage value of the custom cyber-attack parameters and the average of all the combined cyber-attack parameters is calculated to produce the custom threat score. In some embodiments, a representation of the custom threat score is generated and displayed. In some embodiments, if the system began at step 309, a custom threat score is only based on custom cyber-attack parameters.

Figure 4:
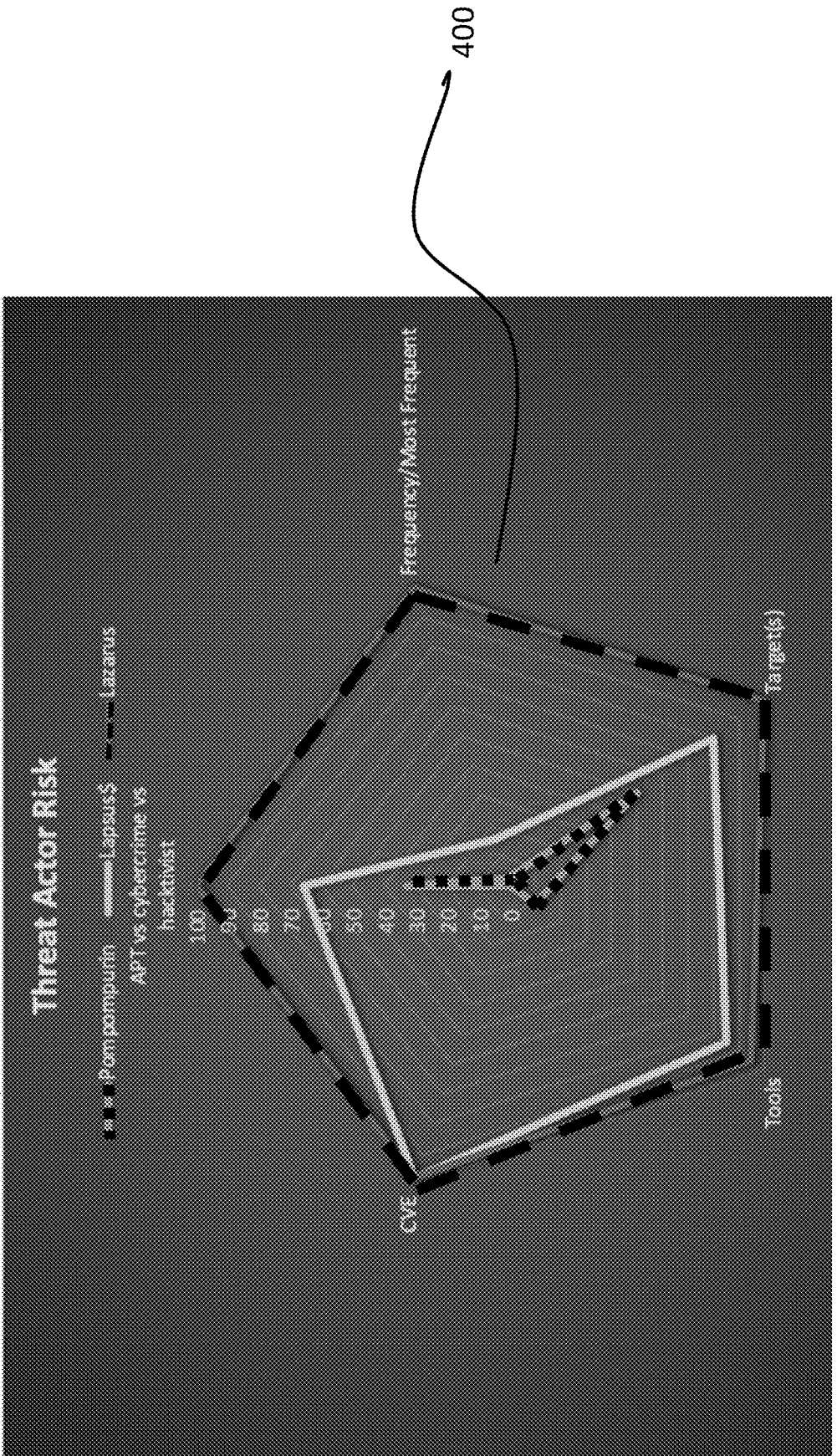
FIG. 4 is a schematic of an example threat actor risk score in some embodiments of the present disclosure.

At 315, in some embodiments, the improved CTI system outputs/displays a dynamic representation of the custom threat score a non-limiting example of which is seen in FIG. 4.

At 317, in some embodiments, the improved CTI system will repeat the process of 309 to 315 at predetermined intervals according to an automated monitoring and collection scheduler. A process to repeat at 201 may also be executed at predetermined intervals according to an automated monitoring and collection scheduler. The predetermined intervals of repeating at 301 may be different than the predetermined intervals to repeat at 309.

In some embodiments, when a large language model is used, some threat cyber-attack parameters or vectors are determined, and are then used to identify other threat vectors and/or the threat actors. In some embodiments, threat vectors that the improved CTI system has the ability to determine include, but are not limited to: Malware; Phishing; Distributed Denial of Service (DDoS) Attacks; Social Engineering; Insider Threats; Advanced Persistent Threats (APTs); Exploit; Data Breaches; Ransomware; Vulnerabilities; Supply Chain Attacks; Crypto related crime; Man-in-the-Middle (MitM) Attacks; Brute Force; Ransomware; Remote Administration Tool (RAT); Botnet; Banking Trojan; Source Code; Services for sale; network access; tools for sale; malicious software; Accounts for sale; Request for services; Doxing; and Web Application.

In some embodiments, the improved CTI system performs a validation process to validate the output of the system. In some embodiments, the validation process is done at predetermined intervals according to an automated scheduler. In some embodiments, the improved CTI system comprises at least one algorithm that compares outputs such as the custom threat scores to standardized patterns of valid outputs. If the comparison of the output and the standardized patterns match the validation process was successful. If, however, there is no match a change in input or training will be required to correct the at least one ML. In some embodiments, the match may be a threshold or a predetermined confidence level.

The improved CTI system may further be operable to generate a visual representation and/or mapping of cyber-attack parameters, and/or likelihood of threat state of an enterprise computing environment organized by threat actor for a display device. This visual cyber-attack representation may facilitate the user and/or administrator to visualize a current cyber-attack parameter for each threat actor in an enterprise computing environment.

By way of non-limiting specific example, FIG. 4 illustrates a visual representation of cyber-attack parameters in accordance with at least some embodiments of the current disclosure. In some embodiments, the visual cyber-attack representation 400 details a radar scoring matrix of different cyber-attack actors and correlated cyber-attack parameters.

In the current example, three threat actors are displayed in three different markings or colors. In current non-limiting example, the three threat actors represented are Pom pompurin by a dotted line, Lapsus$ by a yellow line, and Lazarus by a dashed line. All three threat actors in this example are visually compared by the same cyber-attack parameters. The cyber-attack parameters illustrated in FIG. 4 are:

1. APT vs cybercrime vs hacktivist—that is threat actor type also known as ta type. This parameter may be any combination of advanced persistent threat or APT (which may be a nation state), cybercrime, or hacktivist;
2. frequency/most frequent—that is of these or other cyber parameters;
3. target(s)—that is targeted industries or enterprise or countries;
4. Tools—that is tactics techniques and procedures also known as TTPs. Some examples are malware, attack tools, and attack vectors (methods used by hackers). TTPs describe the way the attacks work; and
5. CVE—that is Common Vulnerabilities and Exposure, CVE (CVE risk acquired from other known databases on cyber threats.)

Further, in this non-limiting specific example, threat actor pom pompurin represented by the dotted line illustrates that the likelihood of the cyber-attack parameters displayed is lower than both the Lapsus$ and Lazarus. Also, Threat actor Lazarus represented by the dashed line illustrates that the likelihood of the cyber-attack parameters displayed is higher than Lapsus$ and Pom Pompuring likelihoods.

In some embodiments, the improved CTI system performs a validation process to validate the output of the system. In some embodiments, the validation process is done at predetermined intervals according to an automated scheduler. In some embodiments, the improved CTI system an algorithm compares outputs such as the custom threat scores to standardized patterns of valid outputs, and if the comparison of the output and the standardized patterns match the validation process was successful. If however there is no match a change in input or training will be required to correct the at least one ML. In some embodiments, the match may be a threshold or a predetermined confidence level.

In some embodiments, software specifically programmed in accordance with one or more principles of the present disclosure may be downloadable from a network, for example, a website, as a stand-alone product or as an add-in package for installation in an existing software application. For example, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

The material disclosed herein may be implemented in software or firmware or a combination of them or as instructions stored on a non-transitory machine-readable medium, which may be read and executed by one or more processors.

As used herein, the terms "computer engine" and "engine" identify at least one software component and/or a combination of at least one software component and at least one hardware component which are designed/programmed/configured to interact with other software and/or hardware components (such as the libraries, software development kits (SDKs), objects, etc.).

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000, and so on. As used herein, the term "user" shall have a meaning of at least one user.

As used herein, terms "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session or can refer to an automated software application which receives the data and stores or processes the data.

The aforementioned examples are, of course, illustrative, and not restrictive.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method, comprising:
   receiving, by a processor in an enterprise computing environment of an enterprise, enterprise specific new data of interest (NDI) from a user in the enterprise computing environment;
   automatically identifying, by the processor and at least one machine learning model (ML), using automated processing of cyber threat intelligence data stored in computer-readable memory, a plurality of new threat actors based on the enterprise specific NDI;
   classifying, by the processor and the at least one ML, using the automated processing, a plurality of custom cyber-attack parameters based on the enterprise specific NDI;
   correlating, by the processor and the at least one ML, within the enterprise computing environment, the plurality of threat actors and the plurality of custom cyber-attack parameters;
   calculating, by the processor, a custom threat score for each threat actor identified based on the correlation of the plurality of cyber-attack parameters to each of the threat actors;
   causing, by the processor, to present, in real-time, a visual mapping of cyber-attack parameters representation including at least one correlated cyber-attack parameter and an associated likelihood value for each of the plurality of threat actors on a display device; and
   automatically facilitating allocation of enterprise computing resources within the enterprise computing environment based on the custom threat score.

2. The method of claim 1, further comprising:
   receiving, by the processor, generic cyber threat intelligence (CTI) data stored in computer-readable memory and obtained from multiple cyber-related data sources;
   classifying, by the processor and the at least one ML, using automated processing the CTI data into relevant CTI data and non-relevant CTI data, wherein relevant CTI data is data related to cyber threat vectors of the enterprise computing environment;

classifying, by the processor and the at least one ML, using automated processing the relevant CTI data into cyber-attack parameters;
   identifying, by the processor and the at least one ML, through the automated processing of the relevant CTI data, a plurality of generic threat actors based on the relevant CTI data;
   correlating, by the processor and the at least one ML, within the enterprise computing environment, the plurality of generic threat actors and the plurality of cyber-attack parameters;
   calculating, by the processor and the at least one ML, using computer-implemented aggregation for the correlated cyber-attack parameters, a generic threat score for each of the plurality of generic threat actors identified based on the correlation of the plurality of cyber-attack parameters to each of the plurality of generic threat actors;
   allocating or prioritizing enterprise computing resources based on the generic threat score; and
   causing, by the processor, to present a visual cyber-attack parameters representation for each of the plurality of threat actor on a display device.

3. The method of claim 2, wherein a second custom threat score is calculated, by the processor, using automated computer-implemented processing based on the generic threat score and the custom threat score.

4. The method of claim 2, wherein the correlation between the plurality of threat actors and the plurality of cyber-attack parameters is a correlation between each of the plurality of threat actors with at least one of the plurality of cyber-attack parameters determined by the processor through automated processing of the CTI data.

5. A method, comprising:
   receiving, by a processor in an enterprise computing environment of an enterprise, enterprise specific new data of interest (NDI) from a user in the enterprise computing environment of an enterprise;
   processing, by the processor and at least one machine learning model (ML), the enterprise specific NDI to generate enterprise specific NDI data terms;
   updating, by the processor, a Natural Language Processing (NLP) engine with the enterprise specific NDI data terms to produce an enhanced NLP engine;
   analyzing, by the processor and the enhanced NLP engine, generic cyber threat intelligence (CTI) data from multiple cyber-related data sources to determine a plurality of custom cyber-attack parameters and a plurality of custom threat actors;
   correlating, by the processor, each of the plurality of custom threat actors and the plurality of custom cyber-attack parameters;
   calculating, by the processor, a custom threat score for each of the plurality of custom threat actors based on the correlation of the plurality of custom cyber-attack parameters to each of the plurality of custom threat actors; and
   transmitting, by the processor, the custom threat score to a display.

6. The method of claim 5, further including: generating, by the processor, a visual representation of the custom threat score.

7. The method of claim 5, wherein the NLP engine further comprises at least one Named Entity Recognition (NER) engine.

8. The method of claim 5, further comprising:

receiving, by the processor, the CTI data from multiple cyber-related data sources;

analyzing, by the processor and the NLP engine, the CTI data to identify a plurality of cyber-attack parameters;

classifying, by the processor, the plurality of identified cyber-attack parameters;

identifying, by the processor, a plurality of generic threat actors;

correlating, by the processor, each of the plurality of generic threat actors and the plurality of cyber-attack parameters;

calculating, by the processor, a generic threat score for each of the generic threat actors identified based on the correlation of the plurality of cyber-attack parameters to each of the plurality of the generic threat actors;

calculating, by the processor, a new custom threat score based on the generic threat score and the custom threat score; and transmitting, by the processor, the new custom threat score to a display.

9. The method of claim 8, further comprising: generating, by the processor, a visual representation of the new custom threat score.

10. A system for determining a custom threat score for an enterprise computing environment of an enterprise, comprising:

a display;

a processor;

at least one machine learning model (ML);

a memory communicatively coupled to the processor, wherein the memory stores processor-executable instructions, which, on execution, cause the processor to:

receive enterprise specific new data of interest (NDI) from a user in the enterprise computing environment of the enterprise;

process, with the at least one ML, the enterprise specific NDI to generate enterprise specific NDI data terms;

update a Natural Language Processing (NLP) engine with the enterprise specific NDI data terms to produce an enhanced NLP engine;

analyze, with the enhanced NLP engine, generic cyber threat intelligence (CTI) data from multiple cyber-related data sources to determine a plurality of custom cyber-attack parameters and a plurality of custom threat actors;

correlate each of the plurality of custom threat actors and the plurality of custom cyber-attack parameters;

calculate a custom threat score for each of the plurality of custom threat actors based on the correlation of the plurality of custom cyber-attack parameters to each of the plurality of custom threat actors; and transmit the custom threat score to a display.

11. The system of claim 10, wherein the processor generates a visual representation of the custom threat score.

12. The system of claim 10, wherein the NLP engine further comprises at least one Named Entity Recognition (NER) engine.

13. The system of claim 10, wherein the processor is further configured to:

receive the CTI data from multiple cyber-related data sources;

analyze, with the NLP engine, the CTI data to identify a plurality of cyber-attack parameters;

classify the plurality of identified cyber-attack parameters;

identify a plurality of generic threat actors;

correlate each of the plurality of generic threat actors and the plurality of cyber-attack parameters;

calculate a generic threat score for each of the generic threat actors identified based on the correlation of the plurality of cyber-attack parameters to each of the plurality of the generic threat actors;

calculate a new custom threat score based on the generic threat score and the custom threat score; and transmit the new custom threat score to a display.

14. The system of claim 13, wherein the processor generates a visual representation of the custom threat score.

15. The system of claim 13, wherein the NLP engine further comprises at least one Named Entity Recognition (NER) engine.

* * * * *